(12) United States Patent
Elledge

(10) Patent No.: US 6,192,478 B1
(45) Date of Patent: Feb. 20, 2001

(54) SECURING RESTRICTED OPERATIONS OF A COMPUTER PROGRAM USING A VISUAL KEY FEATURE

(75) Inventor: Dennis D. Elledge, Nampa, ID (US)

(73) Assignee: Micron Electronics, Inc., Nampa, ID (US)

(*) Notice: Under 35 U.S.C. 154(b), the term of this patent shall be extended for 0 days.

(21) Appl. No.: 09/033,943

(22) Filed: Mar. 2, 1998

(51) Int. Cl.[7] .............................. G06T 7/20; G06F 15/00
(52) U.S. Cl. .................................. 713/202; 345/348
(58) Field of Search .................................. 713/200, 201, 713/202; 711/164; 705/55, 56, 18; 709/225, 229; 382/181, 190, 195, 201; 345/44, 348

(56) References Cited

U.S. PATENT DOCUMENTS

| | | | |
|---|---|---|---|
| 5,465,084 | * 11/1995 | Cottrell | 340/825.31 |
| 5,559,961 | * 9/1996 | Blonder | 714/202 |
| 5,608,387 | * 3/1997 | Davies | 340/825.31 |
| 5,821,933 | * 10/1998 | Keller et al. | 345/348 |

FOREIGN PATENT DOCUMENTS

| | | | | |
|---|---|---|---|---|
| 0 677 801 A1 | * 10/1995 | (EP) | | G06F/1/00 |
| 60-171560 | * 9/1985 | (JP) | | G06F/15/00 |
| 61-142835 | * 6/1986 | (JP) | | H04L/9/00 |
| 9-128208A | * 5/1997 | (JP) | | G06F/3/14 |

OTHER PUBLICATIONS

Knowledge Adventure, Inc., *JumpStart Toddlers User's Guide,* Knowledge Adventure, Inc., 1996, pp. 1–18.

* cited by examiner

*Primary Examiner*—Robert W. Beausoliel, Jr.
*Assistant Examiner*—Christopher Revak
(74) *Attorney, Agent, or Firm*—Dorsey & Whitney LLP

(57) ABSTRACT

An embodiment of the present invention provides a facility for securing the use of a distinguished operation, such as a computer system administration operation, to authorized users. The facility first displays an ornamental image to a user. The displayed ornamental image contains a visual key feature that the facility uses to discern the authority of the user to perform the distinguished operation. The facility then determines whether the user has selected the key feature within the ornamental image. The facility invokes the distinguished operation only in response to a determination that the user has selected the key feature. In this way, only authorized users informed to select the key feature may invoke the distinguished operation.

19 Claims, 5 Drawing Sheets

SECURING RESTRICTED OPERATIONS OF A COMPUTER PROGRAM USING A VISUAL KEY FEATURE

TECHNICAL FIELD

The invention relates to the field of computer security.

BACKGROUND OF THE INVENTION

It is sometimes necessary to restrict the use of sensitive operations performed by a computer program to an authorized subset of the users of the program so that users not among the subset are prevented from using these "restricted operations." As an example, in some cases it may be necessary to restrict the use of certain system administration operations (e.g., a Registry editor for altering the configuration of a computer system) of a computer program to members of a computer support staff, as improper use of such system administration operations by users not among the computer support staff can render a computer system inoperable.

Such restriction of the use of operations to an authorized subset of users is sometimes performed by requiring users to enter a secret password before they may use a restricted operation. FIG. 1 is a display diagram showing the conventional use of a secret password to secure restricted operations. The display diagram shows a window 100 containing a field 101 in which a user attempting to use restricted operations of a program must type a secret password. If the user types a correct password into the field 101, the user is permitted to use the restricted operations. If, on the other hand, the user does not type a correct password into the field 101, the restricted operations are unavailable to the user.

While this secret password approach can be effective to prevent unauthorized users from using restricted operations, it has the disadvantage that it requires each authorized user to memorize a password. This requirement can be especially burdensome for users that are required to memorize several different passwords for various purposes. This requirement is also difficult for authorized users who use the restricted operations infrequently, since it is common for a user's memory of a secret password to fade if not reinforced by regular use.

In view of the above-mentioned shortcomings of the secret password approach to securing restricted operations, a facility capable of effectively restricting use of restricted operations to authorized users without requiring authorized users to memorize a password would have significant utility.

SUMMARY OF THE INVENTION

An embodiment of the present invention secures the use of restricted operations of a computer program, such as computer system administration operations, using a visual "key feature" which is not immediately conspicuous to the end user. In one embodiment, a security facility ("the facility") secures the use of restricted operations by requiring users to select a visual key feature hidden in an ornamental image. For example, users may be required to select a button within an ornamental image of a computer, or to select a hollow within an ornamental image of a tree. The user preferably selects the key feature using a pointing device, such as a mouse. To enable a user to use the restricted operations, an administrator may point out or describe the key feature within the image to the user. To increase the level of security afforded to the restricted operations, some embodiments permit the facility to be configured to require certain additional key presses and/or button presses as part of the selection of the key feature. Other embodiments require the user to perform a specified type of gesture relative to the key feature, such as passing a pointer around the key feature in a small circle, or "dragging" from the key feature to another point within the image.

Embodiments of the invention serve to effectively secure the use of restricted operations without requiring authorized users to memorize a password. The image in which the key feature is hidden serves as a reminder to authorized users of how to access the restricted operations, but does not indicate to unauthorized users that the image contains a security mechanism, nor even that the restricted operations are available to any user. The image containing the key feature may serve one or more additional purposes, including ornamentation, advertising, or information.

DETAILED DESCRIPTION OF THE INVENTION

Embodiments of the present invention secure the use of restricted operations of a computer program, such as computer system administration operations, using a visual "key feature." In one preferred embodiment, a security facility ("the facility") secures the use of restricted operations by requiring users to select a visual key feature hidden in an ornamental image. For example, users may be required to select a button within an ornamental image of a computer, or to select a hollow within an ornamental image of a tree. The user preferably selects the key feature using a pointing device, such as a mouse. To enable a user to use the restricted operations, an administrator may point out or describe the key feature within the image to the user. To increase the level of security afforded to the restricted operations, some embodiments permit the facility to be configured to require certain additional key presses and/or button presses as part of the selection of the key feature. To select the key feature, other embodiments require the user to perform a specified type of gesture relative to the key feature, such as passing a pointer around the key feature in a small circle, or "dragging" from the key feature to another point within the image.

Embodiments of the invention serve to effectively secure the use of restricted operations without requiring authorized users to memorize a password. The image in which the key feature is hidden serves as a reminder to authorized users of how to access the restricted operations, but does not indicate to unauthorized users that the image contains a security mechanism, nor even that the restricted operations are available to any user. The image containing the key feature may serve one or more additional purposes, including ornamentation, advertising, or information.

Figure 1:
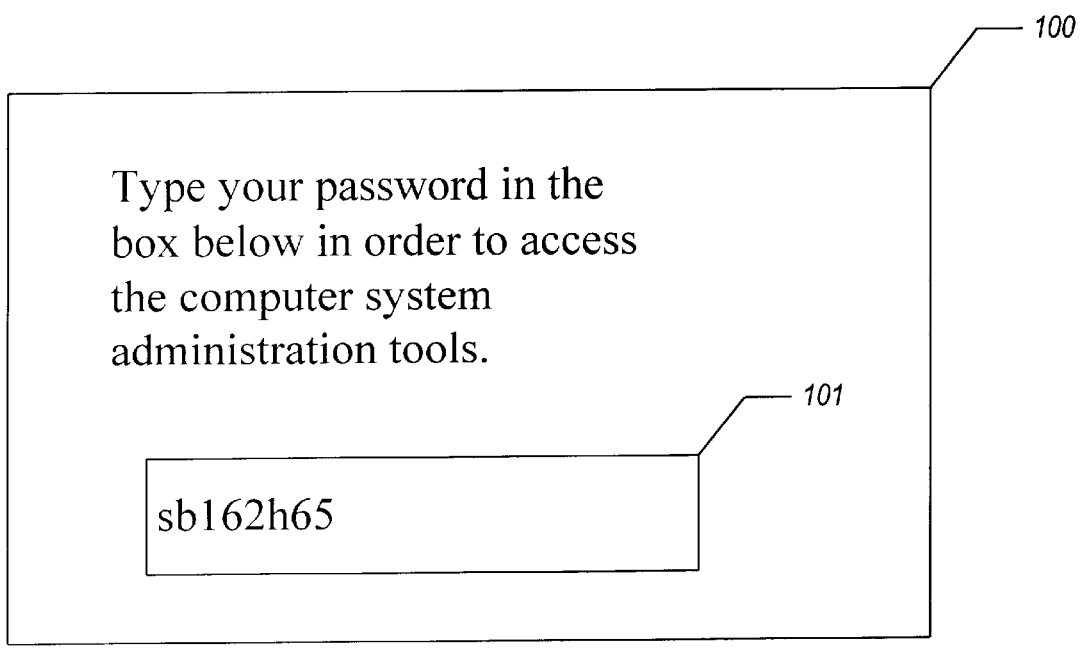
FIG. 1 is a display diagram showing the conventional use of a secret password to secure restricted operations.
Figure 2:
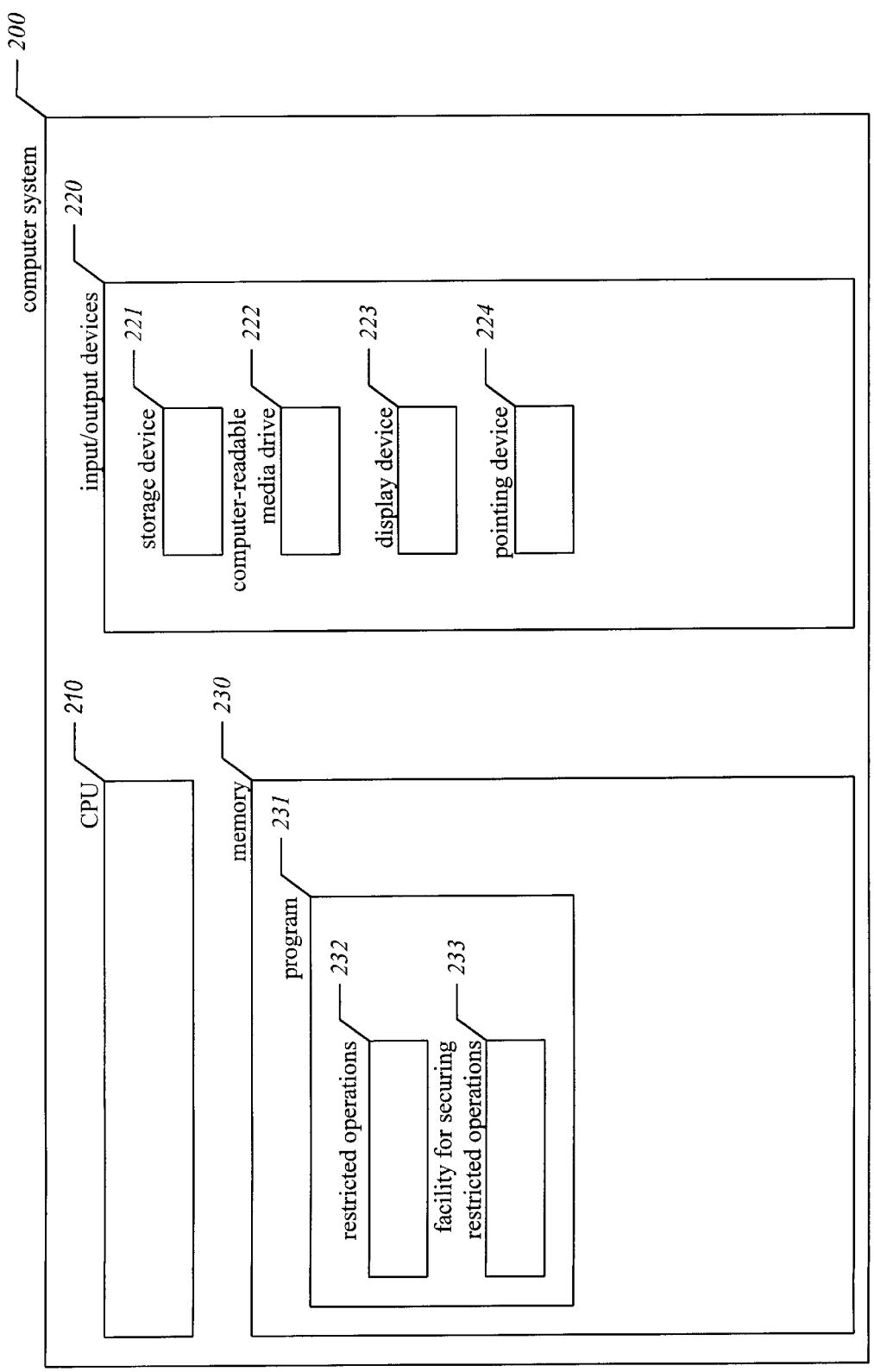
FIG. 2 is a high-level block diagram of a sample general-purpose computer system upon which the facility may execute.

FIG. 2 is a high-level block diagram of a sample general-purpose computer system upon which the facility may execute. The computer system 200 contains a central processing unit (CPU) 210, input/output devices 220, and a computer memory (memory) 230. Among the input/output devices is a storage device 221, such as a hard disk drive, and a computer-readable media drive 222, which can be used to install software products, including the facility, which are provided on a computer-readable medium, such as a CD-ROM. The input/output devices also include a display device 223, such as a video monitor, for displaying visual output of the computer system, and a pointing device 224, such as a mouse, for selecting positions and features within the visual output displayed on the display device. The pointing device preferably controls the movement of a mouse cursor or other pointer within visual output displayed on the display device, and preferably has one or more actuators, such as buttons, for selecting the current position of the pointer. The memory 230 preferably contains a program 231 for providing certain operations. The operations provided by the program include restricted operations 232. The program further incorporates the facility 223 for securing access to these restricted operations. While the facility is preferably implemented on a computer system configured as described above, those skilled in the art will recognize that it may also be implemented on computer systems having different configurations.

Figure 3:
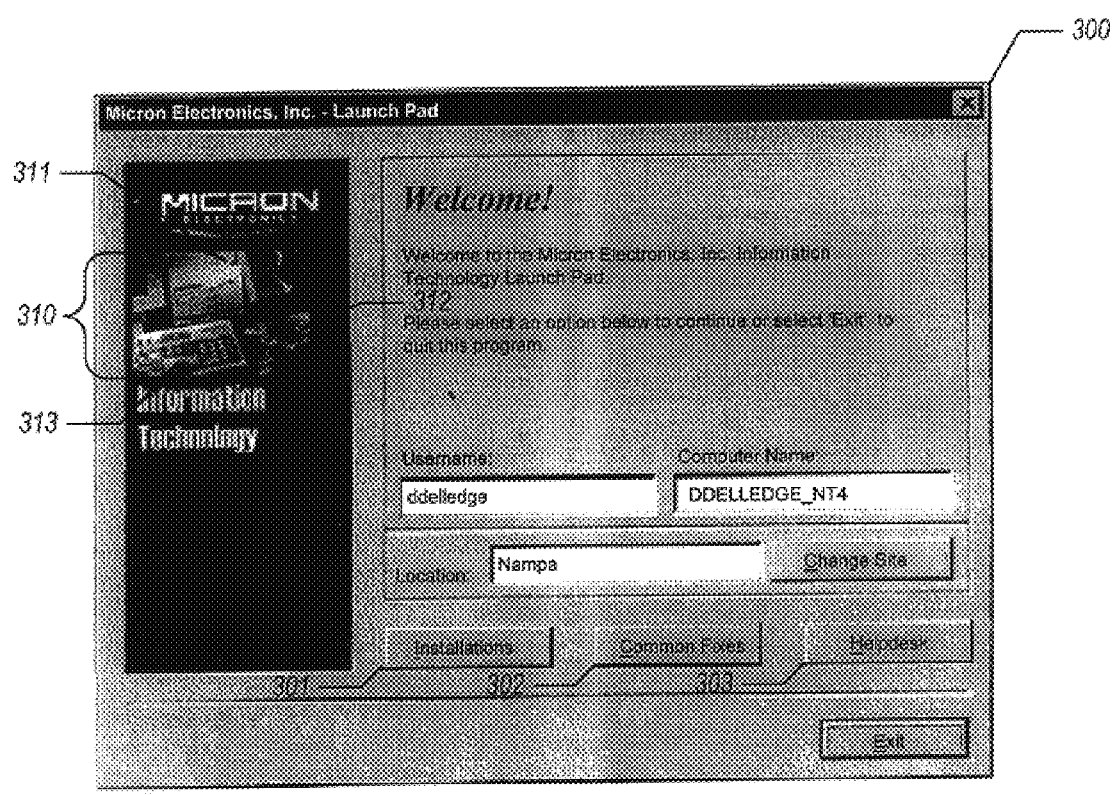
FIG. 3 is a display diagram showing visual information displayed by the program.

FIG. 3 is a display diagram showing visual information displayed by the program 231. It can be seen that the program displays a window 300, which contains controls, such as controls 301, 302, and 303, for using unrestricted operations of the program. Any user may preferably use the pointing device or keyboard to select these controls for unrestricted operations in order to use the unrestricted operations. It can be seen that the window 300 further contains a decorative image 310 of the desktop of a computer user. The image 310 depicts portions of a computer case, monitor, keyboard, and CD-ROMs. Within the depiction of the computer case in the image 310 is hidden the key feature 311. The key feature is camouflaged as a power button 311 within the depiction of the computer case. Alternatively, other visual features of the image 310, such as a hole 312 in the center of a depiction of the CD-ROM or a key 313 in the depiction of the keyboard, could instead be selected as the key feature. The key feature may be identified to authorized users manually by an administrator. Alternatively, the facility may automatically notify authorized users of the identity of the key feature, e.g., via electronic mail.

When an authorized user uses the pointing device to select the key feature, the facility provides access to the restricted operations. An unauthorized user, on the other hand, regards the image 310 as purely decorative, and does not recognize that the restricted operations may be accessed by selecting the key feature. Indeed, such an unauthorized user is never made aware of the availability of the restricted operations.

Figure 4:
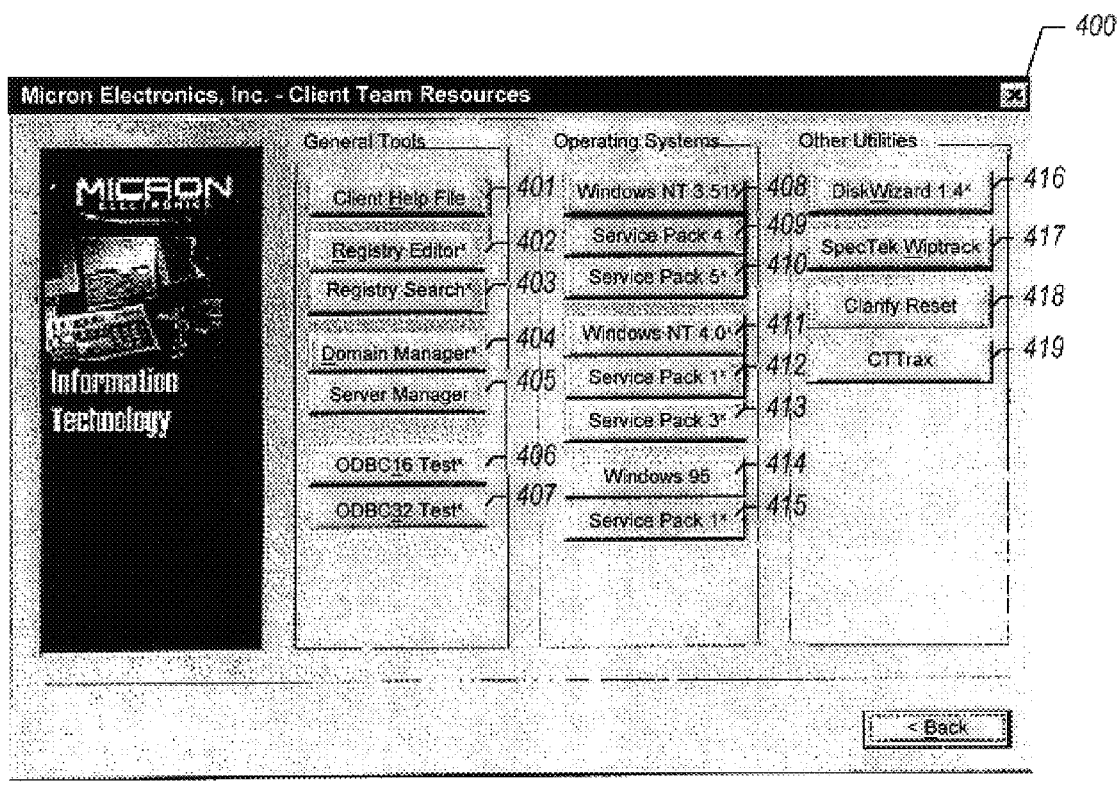
FIG. 4 is a display diagram showing visual information displayed by the program after the user has selected the key feature.

FIG. 4 is a display diagram showing visual information displayed by the program after the user has selected the key feature. It can be seen that a window 400 is displayed, containing controls 401–419 each corresponding to one of the restricted operations. At this point, the user may use the pointing device or keyboard to select one of the controls 401–419 to invoke the corresponding restricted operation.

Figure 5:
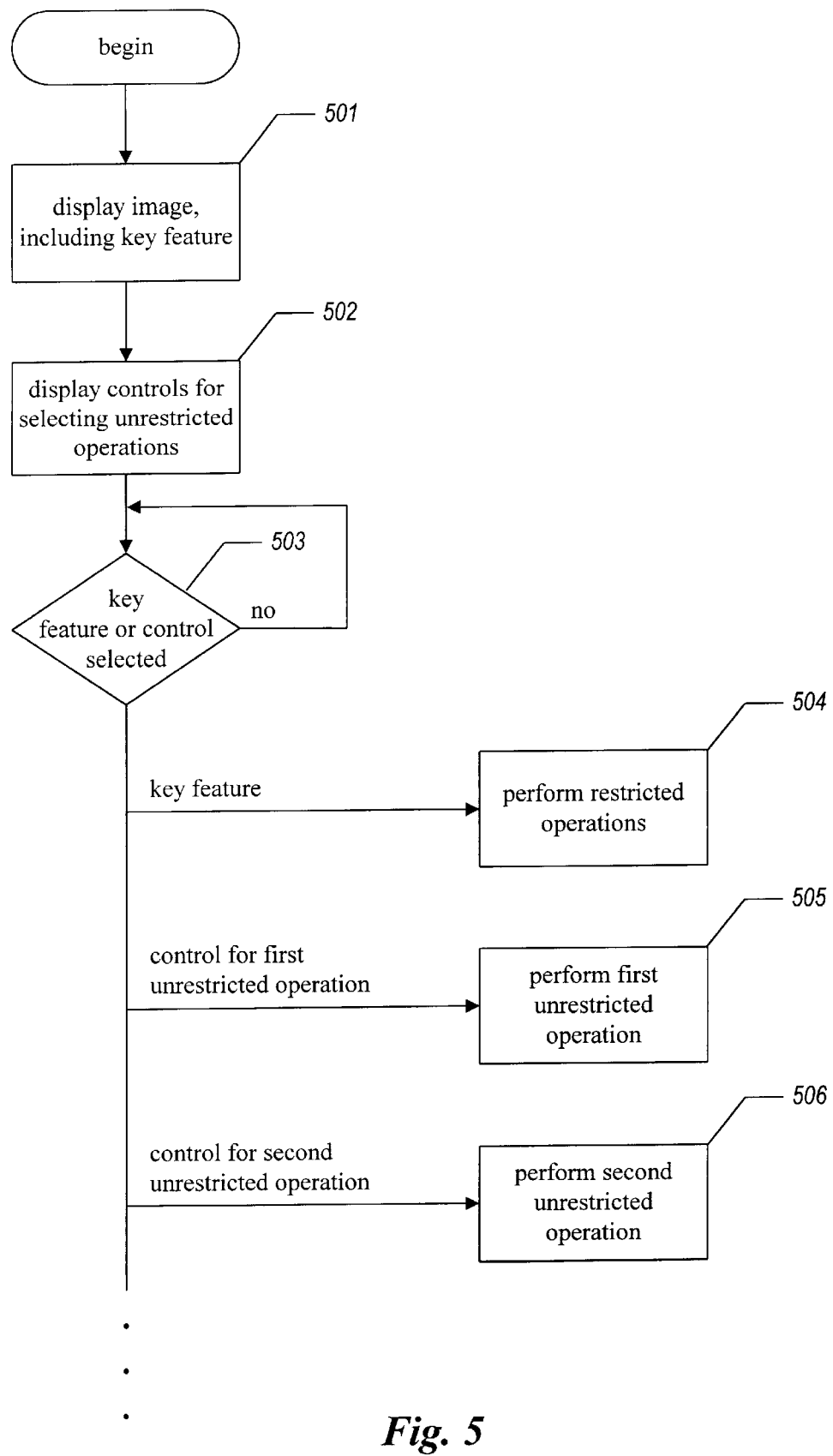
FIG. 5 is a flow diagram showing the steps performed by an example program in order to secure the restricted operations.

FIG. 5 is a flow diagram showing the steps performed by an example program in order to secure the restricted operations. In step 501, the program displays an image containing the key feature, such as image 310. In step 502, the program displays controls for selecting unrestricted operations, such as controls 301, 302, and 303. After step 502, the user may select the key feature or any of the displayed controls. Selecting the key feature preferably includes using the pointing device to position a visual pointer within the key feature, then pressing a button on the pointing device. In alternative embodiments, the act of selecting includes pressing one or more keys on the keyboard and/or using the pointing device to perform some gesture relative to the key feature.

In step 503, if the user has selected the key feature, then the program continues in step 504 to perform the restricted operations. If the user has selected the control for the first unrestricted operation, then the program continues in step 505 to perform the first unrestricted operation. If the user has selected the control for the second unrestricted operation, then the program continues in step 506 to perform the second unrestricted operation. The program proceeds in a similar manner for other controls associated with unrestricted operations. The program preferably remains in step 503 until the key feature or one of the controls is selected.

In one embodiment, the program detects the selection of the key feature by inserting an unobtrusive or invisible user interface control, such as a button, in a position within the image that corresponds to the visual feature. For example, when using the programming environment provided by the Wise Installation System available from Great Lakes Business Solutions, Inc. of Canton, Mich., a developer may design a window such as window 300 containing both an image such as image 310 and an unobtrusive control corresponding to visual feature 311. A program written in this development environment can be designed to branch to perform restricted operations when this unobtrusive control is selected.

In an alternative embodiment, instead of inserting an unobtrusive control into the image, the facility merely defines a "hot spot" region around the visual feature. When the user selects a position within the hot spot, either alone or in conjunction with additional button presses or key presses, the key feature is selected. Further, well-known techniques for detecting particular gestures made with the pointing device in a position proximal to the key feature may be used as part of the process of determining whether the key feature has been selected, as may audio input such as speech. Further, the facility may impose a time limit after the image is first displayed for selecting the key feature to reduce the risk of accidental selection.

While this invention has been shown and described with reference to preferred embodiments, it will be understood by those skilled in the art that various changes or modifications in form and detail may be made without departing from the scope of the invention. For example, while certain of the embodiments discussed above secure restricted operations for computer system administration, similar facilities may secure restricted operations of all types. Further, other user interface techniques for selecting the key feature may be substituted for those described above.

I claim:

1. A method in a computer system for securing the use of a distinguished operation to authorized users, the method comprising the steps of:

displaying to a user an ornamental image, the ornamental image containing a visual key feature for discerning authority of the user to perform the distinguished operation, the display of the ornamental image being unaccompanied by any indication that the ornamental image contains a control;

determining whether the user has selected the key feature within the ornamental image within a preselected time period;

determining whether a preselected gesture has been performed relative to the position of the key feature; and invoking the distinguished operation only in response to a determination that the user has selected the key feature within a selected time period and performed the preselected gesture relative to the key feature, such that only authorized users informed to select the key feature may invoke the distinguished operation.

2. The method of claim 1 wherein the computer system has a pointing device for selecting positions, and wherein the determining step determines that the user has used the pointing device to select a position within the key feature.

3. The method of claim 2 wherein the computer system has a keyboard having a plurality of keys, and wherein the determining step further determines that the user has pressed one of the keys in conjunction with selecting a position within the key feature.

4. The method of claim 2 wherein the computer system has a keyboard having a plurality of keys, and wherein the determining step further determines that the user has pressed a combination of the keys in conjunction with selecting a position within the key feature.

5. The method of claim 1, further comprising the step of providing to a selected user an indication that the distinguished operation may be invoked by selecting the key feature, the provided indication identifying the key feature, in order to enable the selected user to invoke the distinguished operation.

6. The method of claim 1 wherein said computer system includes a keyboard, and wherein the step of invoking the distinguished operation is only performed in response to a further determination that at least one preselected keyboard key has additionally been pressed in association with the selection by the user of the key feature.

7. A computer-readable medium whose contents cause a computer system to secure the use of a distinguished operation to an authorized user by performing the steps of:

displaying to a user an ornamental image, the ornamental image containing a visual key feature for discerning authority of the user to perform the distinguishing operation;

determining whether the user has selected the key feature within the ornamental image within a preselected time period;

determining whether a preselected gesture has been performed relative to the position of the key feature; and invoking the distinguished operation only in response to a determination that the user has selected the key feature within the preselected time period and performed the preselected gesture relative to the key feature, such that only users that select the key feature within the preselected time period and perform the preselected gesture relative to the key feature may invoke the distinguished operation.

8. The computer-readable medium of claim 7 wherein the computer system has a pointing device for selecting positions, and wherein the determining step determines that the user has used the pointing device to select a position within the key feature.

9. The computer-readable medium of claim 7 wherein the contents of the computer-readable medium further cause the computer system to perform the step of providing to a selected user an indication that the distinguished operation may be invoked by selecting the key feature, the provided indication identifying the key feature, in order to enable the selected user to invoke the distinguished operation.

10. The computer-readable medium of claim 7, the contents of which further cause a computer system to invoke the distinguished operation in response to a further determination that at least one preselected keyboard key of a computer system has additionally been pressed in association with the selection by the user of the key feature.

11. A method in a computer system for securing the performance of a distinguishing functionality to authorize users, the method comprising the steps of:

displaying an ornamental image containing a depiction of a substantially button-shaped object acting as a key feature;

overlaying the depiction of a substantially button-shaped object in the ornamental image with a visual user interface button for invoking the distinguished functionality such that the overlaid button appears to be integral to the ornamental image; and performing the distinguished functionality only in response to operation by the user of the overlaid button within a preselected time period and performance by the user of a preselected gesture relative to the key feature and performance by the user of a preselected gesture relative to the key feature.

12. The method of claim 11, further comprising the step of providing to a selected user an indication that the distinguished functionality may be performed by operating the overlaid button, the provided indication identifying the overlaid button, in order to enable the selected user to perform the distinguished functionality.

13. The method of claim 11 wherein the computer system includes a keyboard, and wherein the distinguishing functionality is only performed in response to a further determination that at least one preselected keyboard key has additionally been pressed in association with the operation by the user of the overlaid button.

14. A computer-readable medium whose contents cause a computer system to secure the performance of a distinguished functionality to an authorized user by performing the steps of:

displaying an ornamental image containing a depiction of a substantially button-shaped object;

overlaying the depiction of a substantially button-shaped object in the ornamental image with a visual user interface button for invoking the distinguished functionality such that the overlaid button appears to be integral to the ornamental image; and performing the distinguished functionality only in response to operation by the user of the overlaid button.

15. The method of claim 14 wherein the contents of the computer-readable medium further cause the computer system to perform the step of providing to a selected user an indication that the distinguished functionality may be performed by operating the overlaid button, the provided indication identifying the overlaid button, in order to enable the selected user to perform the distinguished functionality.

16. A computer system for securing the provision of a restricted operation, comprising:

a display device for displaying visual information including an ornamental image incorporating a key visual feature;

an input device for selecting portions of the visual information displayed on the display device and for performing a preselected gesture relative to the key visual feature; and a processor for providing the restricted operation only when the input device is used to select the key feature within the image displayed on the display device within a preselected time period and to perform the preselected gesture relative to the key visual feature, such that the restricted operation is performed only for users that use the input device to select the key feature within the preselected time period and to perform the preselected gesture relative to the key visual feature.

17. The computer system of claim 16 wherein the input device is a mouse.

18. The computer system of claim 16 wherein the display device also displays a mouse cursor signifying a current position of the input device, and wherein the mouse cursor has a visual appearance that is not altered when the mouse cursor is displayed proximally to the key feature.

19. The system of claim 16 further comprising a keyboard, and wherein said processor further performs the restricted operation only when at least one preselected keyboard key has additionally been pressed in association with selection of the key feature and performance of the preselected gesture.

* * * * *

UNITED STATES PATENT AND TRADEMARK OFFICE
CERTIFICATE OF CORRECTION

PATENT NO. : 6,192,478 B1  
APPLICATION NO. : 09/033943  
DATED : February 20, 2001  
INVENTOR(S) : Dennis D. Elledge Page 1 of 1

It is certified that error appears in the above-identified patent and that said Letters Patent is hereby corrected as shown below:

|  | Reads | should read |
|---|---|---|
| Column 5, Line 8 | "a selected" | -- the preselected -- |
| Column 6, Line 29, please delete after "feature" | "and performance by the user of a preselected gesture relative to the key feature" | |

|  | Reads | Should read |
|---|---|---|
| Column 6, Line 48 | "object;" | -- object acting as a key feature;-- |
| Column 6, Line 55, please insert after "button" | | -- within a preselected time period and performance by the user of a preselected gesture relative to the key feature -- |

Signed and Sealed this

Twenty-second Day of August, 2006

JON W. DUDAS  
*Director of the United States Patent and Trademark Office*